US012811124B2

(12) United States Patent
Green

(10) Patent No.: US 12,811,124 B2
(45) Date of Patent: Nov. 24, 2026

(54) MASS SPECTROMETER FOR GENERATING AND SUMMING MASS SPECTRAL DATA

(71) Applicant: Micromass UK Limited, Wilmslow (GB)

(72) Inventor: Martin Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 304 days.

(21) Appl. No.: 18/580,744

(22) PCT Filed: Jul. 19, 2022

(86) PCT No.: PCT/GB2022/051860
§ 371 (c)(1),
(2) Date: Jan. 19, 2024

(87) PCT Pub. No.: WO2023/002168
PCT Pub. Date: Jan. 26, 2023

(65) Prior Publication Data

US 2025/0104990 A1 Mar. 27, 2025

(30) Foreign Application Priority Data

Jul. 20, 2021 (GB) ...................................... 2110412

(51) Int. Cl.
*H01J 49/40* (2006.01)
*H01J 49/06* (2006.01)

(52) U.S. Cl.
CPC ............ *H01J 49/40* (2013.01); *H01J 49/062* (2013.01)

(58) Field of Classification Search
CPC ....... H01J 49/40; H01J 49/062; H01J 49/0027
See application file for complete search history.

(56) References Cited

U.S. PATENT DOCUMENTS

| | | | | |
|---|---|---|---|---|
| 2,938,116 A * | 5/1960 | Benson | H01J 49/147 | |
| | | | 250/287 | |
| 6,195,031 B1 * | 2/2001 | Feld | H03M 1/188 | |
| | | | 341/120 | |

(Continued)

FOREIGN PATENT DOCUMENTS

| | | | |
|---|---|---|---|
| CN | 101496130 A | 7/2009 | |
| CN | 110506320 A | 11/2019 | |

(Continued)

OTHER PUBLICATIONS

Search Report for United Kingdom Patent Application No. GB2110412.0, mailed May 12, 2022.

(Continued)

*Primary Examiner* — David A Vanore
(74) *Attorney, Agent, or Firm* — Goodwin Procter LLP

(57) ABSTRACT

A method of mass spectrometry comprising: mass analysing ions with a mass analyser so as to obtain first mass spectral data: summing the first mass spectral data obtained during a first integration period: obtaining a transmission profile indicative of how the transmission level of first ions to said mass analyser would vary with time during the first integration period; and determining an ion arrival rate of said first ions at the mass analyser during the first integration period based on said transmission profile.

20 Claims, 3 Drawing Sheets

(56) References Cited

U.S. PATENT DOCUMENTS

| | | | | |
|---|---|---|---|---|
| 6,229,142 | B1 * | 5/2001 | Bateman | H01J 49/025 250/288 |
| 6,894,275 | B2 | 5/2005 | Green et al. | |
| 7,312,441 | B2 | 12/2007 | Land et al. | |
| 7,501,621 | B2 * | 3/2009 | Willis | H01J 49/0036 250/281 |
| 8,106,350 | B2 * | 1/2012 | Green | H01J 49/0036 250/281 |
| 8,354,634 | B2 * | 1/2013 | Green | H01J 49/40 250/252.1 |
| 10,832,898 | B2 | 11/2020 | Green et al. | |
| 11,469,091 | B1 * | 10/2022 | Fisher | H01J 49/025 |
| 12,374,536 | B2 * | 7/2025 | Chernyshev | H01J 49/0027 |
| 2004/0084613 | A1 * | 5/2004 | Bateman | H01J 49/067 250/281 |
| 2006/0016976 | A1 * | 1/2006 | Land | H01J 49/4265 250/282 |
| 2006/0020400 | A1 * | 1/2006 | Okamura | H01J 49/025 702/22 |
| 2007/0268171 | A1 * | 11/2007 | Hidalgo | H01J 49/0031 341/155 |
| 2008/0149825 | A1 * | 6/2008 | Kozlovski | H01J 49/4215 250/287 |
| 2009/0057547 | A1 * | 3/2009 | Green | H01J 49/0036 250/282 |
| 2010/0051799 | A1 * | 3/2010 | Makarov | H01J 49/406 250/282 |
| 2010/0133428 | A1 * | 6/2010 | Matsui | H01J 49/0045 250/281 |
| 2010/0213361 | A1 * | 8/2010 | Green | H01J 49/40 250/252.1 |
| 2013/0317756 | A1 * | 11/2013 | Richardson | H01J 49/0036 702/23 |
| 2014/0117219 | A1 * | 5/2014 | Kenny | H01J 49/40 250/252.1 |
| 2014/0326867 | A1 * | 11/2014 | Green | H01J 49/0036 250/282 |
| 2015/0136971 | A1 * | 5/2015 | Green | H01J 49/0009 250/281 |
| 2016/0133450 | A1 * | 5/2016 | Green | H01J 49/061 250/282 |
| 2019/0212297 | A1 * | 7/2019 | Richardson | G01N 27/623 |
| 2020/0136569 | A1 * | 4/2020 | Volkovoy | G01T 1/17 |
| 2025/0104990 | A1 * | 3/2025 | Green | H01J 49/0027 |

FOREIGN PATENT DOCUMENTS

| | | | | |
|---|---|---|---|---|
| CN | 111354619 A | | 6/2020 | |
| CN | 111742390 A | | 10/2020 | |
| EP | 1851786 B1 | * | 12/2013 | H01J 49/40 |
| GB | 2525465 A | | 10/2015 | |
| WO | 2008142418 A2 | | 11/2008 | |
| WO | 2012023031 A2 | | 2/2012 | |
| WO | 2012095655 A1 | | 7/2012 | |
| WO | 2015004459 A1 | | 1/2015 | |
| WO | 2015150806 A1 | | 10/2015 | |
| WO | 2022043695 A1 | | 3/2022 | |

OTHER PUBLICATIONS

International Search Report and Written Opinion for International Patent Application No. PCT/GB2022/051860, mailed Oct. 11, 2022.

* cited by examiner

MASS SPECTROMETER FOR GENERATING AND SUMMING MASS SPECTRAL DATA

CROSS-REFERENCE TO RELATED APPLICATIONS

This application is a U.S. national phase filing claiming the benefit of and priority to International Patent Application No. PCT/GB2022/051860, filed Jul. 19, 2022, which claims priority from and the benefit of United Kingdom patent application No. 2110412.0 filed on Jul. 20, 2021, the entire contents of which are incorporated herein by reference.

FIELD OF THE INVENTION

The present invention relates generally to mass spectrometers that sum mass spectral data over an integration period.

BACKGROUND

A Time of Flight (TOF) mass analyser is a known form of mass analyser that pulses a packet of ions into a time of flight region (e.g. a field-free region) and towards an ion detector. The ions separate out according to their mass to charge ratios, as they pass through the time of flight region, and then strike an ion detector. As such, the separated ions arrive at the ion detector at different times, wherein the time at which an ion arrives at the detector is related to its mass to charge ratio. The mass to charge ratio of a given ion can therefore be determined from the duration of time between the time at which it was pulsed into the time of flight region and the time at which it was detected by the ion detector. The mass analyser is therefore able to determine the mass to charge ratios of the ions pulsed into the mass analyser and their intensities and form a mass spectrum.

It is conventional for the mass analyser to repeatedly pulse packets of ions into the time of flight region and obtain mass spectral data for the ions detected from these pulses. The mass spectral data detected from multiple pulses that occur over a predetermined amount of time (i.e. a predetermined number of pulses) are summed so as to form a composite mass spectrum. This predetermined amount of time is known as an integration period.

TOF mass spectrometers, and particularly orthogonal acceleration TOF mass spectrometers, comprise various ion-optics for transmitting or manipulating the ions prior to their arrival at the TOF mass analyser. For example, the spectrometer may comprise mass filters, collision cells, and ion guides such as multipole or stacked-ring ion guides. RF voltages are applied to such ion-optical components in order to confine ions therein, but this leads to any given ion-optical component having a mass-dependent transmission characteristic related to the amplitude and frequency of the RF voltage applied to it (and to the geometry of the ion-optical component). Accordingly, if the amplitude and frequency of the RF voltage are maintained constant, then ions of different mass to charge ratio will have different transmission efficiencies through the ion-optical component. This may lead to relatively poor transmission of some ions.

When it is desired to transmit ions having a relatively wide range of mass to charge ratios to the TOF mass analyser, it may not be possible to select the properties of the RF voltages applied to the upstream ion-optical components so as to simultaneously transmit all of these ions to the TOF mass analyser with high efficiency. As such, the properties of the RF voltages applied to one or more of the upstream ion-optical components may be scanned during the integration time, such that ions having mass to charge ratios of interest are transmitted with a relatively high efficiency during at least some of the integration time. However, varying the level of transmission with integration time in this manner causes the ion arrival rate at the TOF mass analyser to vary significantly with integration time, making it difficult to determine the range of ion arrival rates from the final composite mass spectrum. This information is required, for example, to control the ion arrival rate to remain below a desired target threshold at all times.

SUMMARY

From a first aspect the present invention provides a method of mass spectrometry comprising: mass analysing ions with a mass analyser so as to obtain first mass spectral data; summing the first mass spectral data obtained during a first integration period; obtaining a transmission profile indicative of how the transmission level of first ions to said mass analyser would vary with time during the first integration period; and determining an ion arrival rate of said first ions at the mass analyser during the first integration period based on said transmission profile.

The method may comprise determining an intensity in the summed mass spectral data of said first ions having a selected mass to charge ratio; and said step of determining an ion arrival rate may comprise determining the ion arrival rate of said first ions at the mass analyser as a function of time during the first integration period based on said intensity and said transmission profile.

Embodiments of the invention predict the actual ion arrival rate of a given mass to charge ratio as a function of time during the integration period, e.g. as opposed to determining the average ion arrival rate over the whole integration period. As such, embodiments are able to use this information to better control the spectrometer based on the ion arrival rate, e.g. so as to prevent saturation of the ion detection system. Additionally, or alternatively, embodiments are able to use the determined ion arrival rate to correct mass spectral data that has been distorted and does not accurately reflect the ion arrival rate that is being received at the detector (e.g. due to detector saturation).

The method may comprise controlling the operation of a mass spectrometer that comprises said mass analyser based on the determined ion arrival rate of said first ions.

The method may comprise mass analysing ions with the mass analyser so as to obtain second mass spectral data and summing that second mass spectral data obtained during a second integration period; wherein said controlling the operation of the mass spectrometer is performed during the second integration period.

The method may comprise adjusting mass spectral data obtained by the mass analyser based on the determined ion arrival rate of said first ions.

This method may comprise mass analysing ions with the mass analyser so as to obtain second mass spectral data and summing that second mass spectral data obtained during a second integration period; and said adjusting of the mass spectral data may be performed on the mass spectral data obtained in the second integration period.

The second integration period described herein may be the same duration of time as the first integration period.

The step of mass analysing ions may comprise performing a plurality of mass analysis cycles during the first integration period so as to obtain a plurality of respective sets of mass spectral data.

The step of summing the first mass spectral data may comprise summing the plurality of respective sets of mass spectral data Similarly, the step of mass analysing ions may comprise performing a plurality of mass analysis cycles during the second integration period so as to obtain a plurality of respective sets of mass spectral data; and the step of summing the second mass spectral data may comprise summing the plurality of respective sets of mass spectral data.

Said mass analysing may be performed using a time of flight mass analyser, although other types of mass analyser may be used.

The time of flight (TOF) mass analyser performs a mass analysis cycle in which it pulses a packet of ions into a time of flight region and to an ion detector, and detects the intensity of the ions striking the detector as a function of time so as to obtain mass spectral data. The TOF mass analyser repeatedly performs this mass analysis cycle during the integration period and sums the mass spectral data obtained from the multiple pulses.

The variation in the transmission level of said first ions to said mass analyser during the integration period may be caused by one or more ion-optical devices upstream of the mass analyser.

Accordingly, the method may comprise varying the operation of one or more ion-optical devices arranged upstream of the mass analyser with time according to a scan function during each of the first and/or second integration period such that said first ions, or parent ions of said first ions, are transmitted by the one or more ion-optical devices with an intensity that varies as a function of time within each of the first and/or second integration period.

An RF voltage may be applied to at least one of the one or more ion-optical devices and the RF voltage may be varied with time according to a scan function during each of said first and/or second integration period. The amplitude and/or frequency of the RF voltage may be varied with time according to the scan function during each of said first and/or second integration period.

At least one of the one or more ion-optical device may be an RF-only ion guide and an RF voltage applied thereto may be varied with time according to a scan function during each of said first and/or second integration period.

At least one of the one or more ion-optical devices may be a mass filter having a mass transmission window that is varied with time according to a scan function during each of said first and/or second integration period.

For example, the mass filter may be a (e.g. wideband) mass filter that transmits a range of different mass to charge ratios at any given time, but that is scanned with time so that the lower and/or upper ends of the transmitted mass range change during each of said first and/or second integration period.

The scan function may be synchronised with the first and/or second integration period of the mass analyser such that the scan function is performed one or more complete times during each of the first and/or second integration period.

The mass analyser may obtain mass spectral data during a single experimental run in multiple consecutive integration periods (e.g. to form multiple respective composite mass spectra). In these embodiments, the scan function may be synchronised so that it is repeated one or more times for each integration period.

The method may comprise receiving an electronic input indicating a range of mass to charge ratios that is to be analysed by the mass analyser, and automatically selecting the scan function for each of the one or more ion-optical devices from a plurality of scan functions based on said range of mass to charge ratios. For example, if a first range of mass to charge ratios is input then the mass spectrometer comprising the mass analyser may automatically select and apply a first scan function to an ion-optical device during the integration time, whereas if a second, different range of mass to charge ratios is input then the mass spectrometer may automatically select and apply a second, different scan function to the ion-optical device during the integration time.

At least one of the one or more ion-optical devices may be an ion mobility separator.

The ion mobility separator may be synchronised with the mass analyser so as to perform one or more complete mobility separation cycle during each of the first and/or second integration period.

The ion mobility separator may separate ions such that ions of different mobility are mass analysed at different times during each of the first and/or second integration period.

The ion mobility separator may be a drift-time ion mobility separator, a trapped ion mobility separator or a FAIMS device.

Alternatively, a separator that separates ions by a physicochemical property other than mobility may be provided. Ions having different values of the physicochemical property may be mass analysed at different times during each of the first and/or second integration period.

Embodiments have been described that comprise obtaining a transmission profile indicative of how the transmission level of said first ions to said mass analyser would vary with time during the first integration period. In these embodiments the transmission profile may be known or may be theoretically determined. Alternatively, this transmission profile may be determined experimentally by measuring the intensity of the first ions (using the mass analyser) as a function of time over a period of time in which the spectrometer is operating under substantially the same conditions as during the integration period. The transmission profile may be determined before or after the first integration period (e.g. in a separate acquisition period of the same experimental run or in a different experimental run).

Said step of determining an intensity may comprise determining the total number of first ions received over the first integration period at a detector of the mass analyser performing said mass analysing.

Said step of controlling the operation of the mass spectrometer may comprise controlling the transmission level of ions to the mass analyser during the second integration period based on said determined ion arrival rate of said first ions.

Where said step of controlling the operation of the mass spectrometer requires a change to the operation of the spectrometer, this change may be made between the first and second integration periods. For example, if the transmission level of ions to the mass analyser is required to be changed in response to the determined ion arrival rate of said first ions, then the level of attenuation that the spectrometer is set to perform may be changed between the first and second integration periods.

Said step of controlling the transmission level of ions may comprise attenuating ions at a level that is based on said determined ion arrival rate of said first ions.

The ions may attenuated at a constant level, that is based on said determined ion arrival rate of said first ions, for at least part of the second integration period.

Said determined ion arrival rate may include a relatively high ion arrival rate at a first time after the start of the first integration period and a relatively lower ion arrival rate at a second, different time after the start of the first integration period; and the transmission level of ions to the mass analyser during said second integration period may be controlled based on said determined ion arrival rate so as to perform a relatively high level of attenuation at a time after the start of said second integration period that corresponds to said first time, and to perform a relatively lower level of attenuation at a time after the start of said second integration period that corresponds to said second time.

For example, said determined ion arrival rate may include a relatively high ion arrival rate at a first time after the start of the first integration period and a relatively lower ion arrival rate at a second, later time after the start of the first integration period. The transmission level of ions to the mass analyser during said second integration period may be controlled based on said determined ion arrival rate so as to perform a relatively high level of attenuation at a time after the start of said second integration period that corresponds to said first time, and to perform a relatively lower level of attenuation at a time after the start of said second integration period that corresponds to said second time. Additionally, or alternatively, said determined ion arrival rate may include a relatively low ion arrival rate at one time after the start of the first integration period and a relatively higher ion arrival rate at another, later time after the start of the first integration period. The transmission level of ions to the mass analyser during said second integration period may be controlled based on said determined ion arrival rate so as to perform a relatively low level of attenuation at a time after the start of said second integration period that corresponds to said one time, and to perform a relatively higher level of attenuation at a time after the start of said second integration period that corresponds to said another time.

Said step of controlling the transmission level of ions may comprise attenuating ions based on the determined ion arrival rate of said first ions so as to maintain the maximum ion arrival rate during at least part of the second integration period below a target threshold.

The ions may be attenuated so as to maintain the maximum ion arrival rate below the target threshold for the whole of the second integration period.

Alternatively, the ions may be attenuated so as to maintain the maximum ion arrival rate below the target threshold for a pre-selected duration (i.e. only a portion) of the second integration period. In these embodiments the ion arrival rate may be allowed to exceed the target threshold for part of the second integration period, e.g. because that may not be significantly detrimental to the mass spectral data obtained. However, the spectrometer may be configured so as not to allow this and to maintain the maximum ion arrival rate below the, or a, target threshold for the whole of the second integration period if the determined ion arrival rate exceeds a certain value during the integration period.

The target threshold may be selected so as to prevent saturation of the detector in the mass analyser.

The mass analyser may comprise an ion detector having an amplifier for amplifying the ion signal generated in the ion detector, and said step of controlling the operation of the mass spectrometer comprises controllably varying the gain of the amplifier during the second integration period as a function of time based on said determined ion arrival rate of said first ions.

For example, the gain may be varied such that the amplified signal remains within a predetermined range of amplitudes throughout the second integration period. For example, said determined ion arrival rate may include a relatively high ion arrival rate at a first time after the start of the first integration period and a relatively lower ion arrival rate at a second, different time after the start of the first integration period; and the gain may be controlled in the second integration period based on said determined ion arrival rate so as to apply a relatively low level of gain to the detector at a time after the start of said second integration period that corresponds to said first time, and to perform a relatively higher level of gain at a time after the start of said second integration period that corresponds to said second time.

Alternatively, the gain may be controlled to be constant throughout the second integration period.

In further alternative embodiments the amplifier gain may be constant throughout the second integration period (and not based on the ion arrival rate), but the detector gain maybe varied based on the ion arrival rate.

The method may comprise using said determined ion arrival rate to calculate a correction factor for mass spectral data of the first ions.

For example, the method may comprise identifying from said determined ion arrival rate that the ion arrival rate of the first ions exceeds a target threshold ion arrival rate whilst the mass spectral data is being obtained. The target threshold may correspond to an ion arrival rate at which the detector of the mass analyser is saturated and therefore cannot accurately record all of the ions received at the detector. Accordingly, in response to this the method may correct the mass spectral data for the first ions, e.g. by increasing the intensity detected for the ions.

The correction factor may be applied to the mass spectral data obtained in the second integration period.

Although the method has been described as being performed in relation to first ions having a selected mass to charge ratio, the method may also include corresponding steps for second ions (and optionally also further ions) having a different mass to charge ratio. Accordingly, the method may comprise: determining an intensity in the summed mass spectral data of second ions having a second, different mass to charge ratio; calculating or estimating the proportion of the first integration period during which said second ions are transmitted to the mass analyser; and determining the ion arrival rate of said second ions at the mass analyser during the first integration period based on said intensity and said proportion of the first integration period. The method may then perform steps corresponding to those described for the first ions, but instead for the second ions.

Similarly, the method may comprise: determining the intensity in the summed spectral data of second ions having a second, different mass to charge ratio; obtaining a transmission profile indicative of how the transmission level of these second ions to said mass analyser would vary with time during the first integration period; and determining the ion arrival rate of said second ions at the mass analyser as a function of time during the first integration period based on the intensity and transmission profile. The method may then perform steps corresponding to those described for the first ions, but instead for the second ions.

The first aspect of the present invention also provides a mass spectrometer comprising: a mass analyser for mass analysing ions and control circuitry configured to control the mass spectrometer to: mass analyse ions with the mass analyser so as to obtain mass spectral data; sum the mass spectral data obtained during an integration period; store or obtain a transmission profile indicative of how the transmission level of first ions to said mass analyser would vary with time during the integration period; and determine an ion arrival rate of said first ions at the mass analyser during the integration period based on said transmission profile.

The mass spectrometer may be configured with electronic circuitry so as to perform any of the methods described herein.

For example, the spectrometer may comprise circuitry configured to control the mass spectrometer based on the determined ion arrival rate of said first ions and/or to adjust mass spectral data obtained by the mass analyser based on the determined ion arrival rate of said first ions.

The first aspect of the present invention also provides a method of mass spectrometry comprising: mass analysing ions with a mass analyser so as to obtain first mass spectral data; summing the first mass spectral data obtained during a first integration period; determining an intensity in the summed mass spectral data of first ions having a selected mass to charge ratio; obtaining a transmission profile indicative of how the transmission level of said first ions to said mass analyser would vary with time during the first integration period; and determining the ion arrival rate of said first ions at the mass analyser as a function of time during the first integration period based on said intensity and said transmission profile.

The first aspect of the present invention also provides a mass spectrometer comprising: a mass analyser for mass analysing ions and control circuitry configured to control the mass spectrometer to: mass analyse ions with the mass analyser so as to obtain mass spectral data; sum the mass spectral data obtained during an integration period; determine an intensity in the summed mass spectral data of first ions having a first mass to charge ratio; store or obtain a transmission profile indicative of how the transmission level of said first ions to said mass analyser would vary with time during the integration period; and determine the ion arrival rate of said first ions at the mass analyser as a function of time during the integration period based on said intensity and said transmission profile.

The present invention is not limited to the specific steps described to determine the ion arrival rate of the ions at the mass analyser. As such, from a second aspect the present invention provides a method of mass spectrometry comprising: determining the ion arrival rate of ions having a first mass to charge ratio at a mass analyser as a function of time over a period in which the mass analyser obtains and sums mass spectral data; and controlling the operation of a mass spectrometer comprising said mass analyser based on said ion arrival rate and/or adjusting the mass spectral data obtained by the mass analyser based on said ion arrival rate.

This method may comprise any of the features described above in relation to the first aspect of the invention, except that it need not be limited to the steps described for determining the ion arrival rate of the ions at the mass analyser.

The second aspect of the invention also provides a mass spectrometer comprising: a mass analyser for mass analysing ions and control circuitry configured to control the mass spectrometer to: determine the ion arrival rate of ions having a first mass to charge ratio at the mass analyser as a function of time over a period in which the mass analyser obtains and sums mass spectral data; and change how it operates based on said ion arrival rate and/or adjust the mass spectral data obtained by the mass analyser based on said ion arrival rate.

The present invention is not limited to the determining the ion arrival rate of the ions at the mass analyser. As such, from a third aspect the present invention provides a method of mass spectrometry comprising: controlling the operation of a mass spectrometer comprising a mass analyser, and/or adjusting mass spectral data obtained by a mass analyser, based on the ion arrival rate of ions having a first mass to charge ratio at the mass analyser as a function of time over a period in which the mass analyser obtains and sums mass spectral data.

This method may comprise any of the features described above in relation to the first aspect of the invention, except that it need not be limited to determining the ion arrival rate of the ions at the mass analyser.

The invention also provides a mass spectrometer comprising: a mass analyser for mass analysing ions and control circuitry configured to control the mass spectrometer to: vary the operation of the mass spectrometer, and/or adjust mass spectral data obtained by the mass analyser, based on an ion arrival rate of ions having a first mass to charge ratio at the mass analyser as a function of time over a period in which the mass analyser obtains and sums mass spectral data.

From a fourth aspect the present invention also provides a method of mass spectrometry comprising: mass analysing ions with a mass analyser so as to obtain first mass spectral data; summing the first mass spectral data obtained during a first integration period; determining an intensity in the summed mass spectral data of first ions having a selected mass to charge ratio; calculating or estimating the proportion of the first integration period during which said first ions are transmitted to the mass analyser; and determining the ion arrival rate of said first ions at the mass analyser during the first integration period based on said intensity and said proportion of the first integration period.

This aspect may have any of the features described in relation to the first aspect of the invention, except only optionally and not necessarily limited to the step of obtaining a transmission profile indicative of how the transmission level of said first ions to said mass analyser would vary with time during the first integration period. Additionally, or alternatively, this method is only optionally and not necessarily limited to determining the ion arrival rate of said first ions at the mass analyser as a function of time during the first integration period.

For example, the method may comprise varying the operation of one or more ion-optical devices arranged upstream of the mass analyser with time according to a scan function during each of the first and/or second integration period such that said first ions, or parent ions of said first ions, are transmitted by the one or more ion-optical devices with an intensity that varies as a function of time within each of the first and/or second integration period.

At least one of the one or more ion-optical devices may be a mass filter having a mass transmission window that is varied with time according to a scan function during each of said first and/or second integration period. For example, the mass filter may be a (e.g. wideband) mass filter that transmits a range of different mass to charge ratios at any given time, but that is scanned with time so that the lower and/or upper ends of the transmitted mass range change during each of said first and/or second integration period.

The step of calculating or estimating the proportion of the first integration period during which said first ions are transmitted to the mass analyser comprises dividing the duration of time during the integration period in which the mass filter is able to transmit the first ions by the duration of the integration period.

For example, where the mass transmission window is scanned through a range of mass to charge ratios at a fixed rate, the step of calculating or estimating the proportion of the first integration period during which said first ions are transmitted to the mass analyser may comprise dividing the size of the mass transmission window by the range of mass to charge ratios that it is scanned through.

More generally, the step of calculating or estimating the proportion of the first integration period during which said first ions are transmitted to the mass analyser may comprise dividing the duration of time (during the integration period) in which the first ions are able to be transmitted to the mass analyser by the duration of the integration period.

The step of determining the ion arrival rate may comprise dividing the intensity of the first ions by the duration of time (during the integration period) in which the first ions are able to be transmitted to the mass analyser. In embodiments in which the mass analysis comprises performing a plurality of mass analysis cycles during the integration period, the method may comprise dividing the above-described ion arrival rate by the number of cycles performed during the integration period to obtain the ion arrival rate per cycle. For example, for TOF mass analysis the ion arrival rate per TOF push may be determined by dividing the ion arrival rate by the TOF pusher frequency. The operation of the spectrometer, such as the attenuation, may then be controlled based on this ion arrival rate per cycle.

The fourth aspect also provides a mass spectrometer comprising: a mass analyser for mass analysing ions and control circuitry configured to control the mass spectrometer to: mass analyse ions with the mass analyser so as to obtain mass spectral data; sum the mass spectral data obtained during an integration period; determine an intensity in the summed mass spectral data of first ions having a first mass to charge ratio; calculate or estimate the proportion of the first integration period during which said first ions are transmitted to the mass analyser; and determine the ion arrival rate of said first ions at the mass analyser during the first integration period based on said intensity and said proportion of the first integration period.

The mass spectrometer may be configured with electronic circuitry so as to perform any of the methods described herein.

For example, the spectrometer may comprise circuitry configured to control the mass spectrometer based on the determined ion arrival rate of said first ions and/or to adjust mass spectral data obtained by the mass analyser based on the determined ion arrival rate of said first ions.

BRIEF DESCRIPTION OF THE DRAWINGS

Various embodiments of the present invention will now be described, by way of example only, and with reference to the accompanying drawings in which.

DETAILED DESCRIPTION

Although the present invention relates to mass spectrometers in general, for illustrative purposes only, embodiments will be described that relate to Time of Flight (TOF) mass spectrometers.

Figure 1:
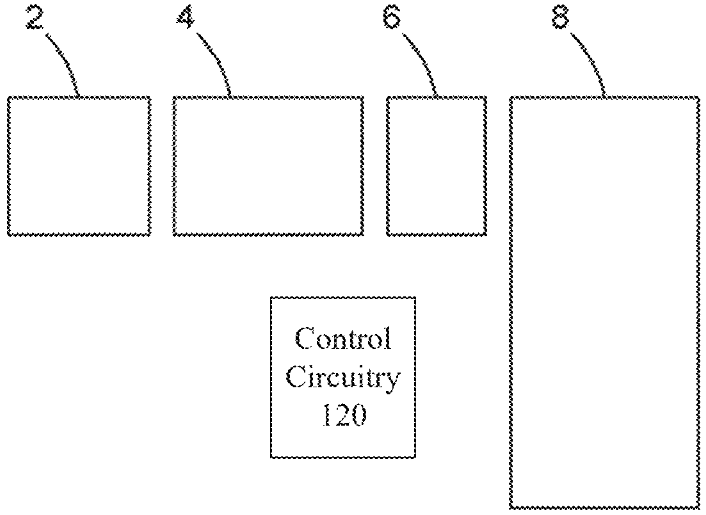
FIG. 1 shows a schematic of an embodiment of a mass spectrometer according to the present invention.

FIG. 1 shows a schematic of an embodiment of the present invention comprising an ion source 2, a quadrupole rod set ion guide 4, a fragmentation cell 6 and a TOF mass analyser 8. In operation, ions are generated by ion source 2 and pass to the ion guide 4. RF voltages are applied to the ion guide 4 so that it radially confines the ions and transmits them downstream. The ion guide 4 may be an RF-only ion guide, although it may be capable of being operated (in another mode) as a mass filter by also applying a DC voltage to it. Ions that are transmitted by the mass filter 4 pass into the fragmentation cell 6, which may be operated in a low collision mode in which there is relatively little or no fragmentation of the ions passing therethrough. Alternatively, the fragmentation cell 6 may be operated in a high collision mode is which there is a substantial amount of fragmentation of the ions passing therethrough so as to form fragment ions. An RF ion guide may be arranged in the fragmentation cell 6 for guiding the ions therethrough. The ions exiting the fragmentation cell 6 may then pass into the TOF mass analyser 8. Control circuitry 120 may be configured to operate mass spectrometers, ion sources, mass analysers, and/or mass filters described herein.

The TOF mass analyser 8 has an extraction region that intermittently pulses packets of ions into a time of flight region (e.g. a field-free region) and towards an ion detector. For each pulse, the ions in the respective packet of ions separate out according to their mass to charge ratios as they pass through the time of flight region, and then strike the ion detector. As such, the separated ions from each pulse arrive at the ion detector at different times, wherein the time at which an ion arrives at the detector is related to its mass to charge ratio. The mass to charge ratio of a given ion is therefore related to the duration between the time at which it was pulsed into the time of flight region and the time at which it was detected by the ion detector. The mass analyser 8 determines, from the detector signal, the times at which the ions arrive at the detector (relative to the timing of the pulse of ions) along with the intensities of the ions and records this mass spectral data.

The TOF mass analyser 8 repeatedly pulses packets of ions into the time of flight region and obtains mass spectral data for the ions detected from each of these pulses. The mass spectral data detected from multiple pulses that occur over a predetermined amount of time (i.e. a predetermined number of pulses), known as an integration period, is then summed so as to form composite mass spectral data. This composite mass spectral data may then be used to form a mass spectrum. The locations of the peaks in such a mass spectrum may then be found and the intensities and mass to charge ratios of these peaks may be determined in the conventional manner.

As described above, the mass spectrometer may comprise a quadrupole RF ion guide 4 and an RF ion guide in the fragmentation cell 8. However, it is contemplated that the spectrometer may comprise additional or alternative types of ion guides, and/or that the spectrometer may comprise other types of ion-optical devices upstream of the mass analyser 8, to which RF voltages are applied. For example, other types of ion-optical devices may be provided that have RF voltages applied to them in order to confine ions therein. However, the application of an RF voltage to any given ion-optical device may result in it having mass to charge ratio dependent transmission characteristics that are related to the amplitude and/or frequency of the RF voltage applied thereto. Accordingly, if the amplitude and/or frequency of the RF voltage applied to the device is maintained constant, then ions of different mass to charge ratios may have different transmission efficiencies through the ion-optical component. This may result in a poor signal for one or more of the species of ion at the mass analyser 8.

Accordingly, when it is desired to transmit species of ions having a range of mass to charge ratios to the mass analyser 8, the amplitude and/or frequency of the RF voltage applied to one or more of the ion-optical devices upstream of the mass analyser 8 may be varied with time, during the integration period of the mass analyser 8. This helps ensure that ions of different mass to charge ratios will have sufficiently high transmission efficiencies through the ion-optical device during at least some of the integration period, so that these ions will have sufficient intensities to be well represented in the composite mass spectrum.

For example, the amplitude and/or frequency of the RF voltage applied to each of the one or more of the ion-optical devices may be varied with time according to a particular scan function during the integration period of the mass analyser 8. The scan function may be synchronised with the integration period of the mass analyser, e.g. such that the scan function begins when the integration period begins and the scan function ends when the integration period ends. The mass analyser 8 may obtain mass spectral data during a single experimental run in multiple consecutive integration periods (e.g. to form multiple respective composite mass spectra). In these embodiments, the scan function may be synchronised so that it is repeated for each integration period, e.g. with the start time of the scan function coinciding with the start time of its respective integration period and the end time of the scan function coinciding with the end time of its respective integration period. Alternatively, rather than the scan function being performed only once during each integration period, the scan function may be synchronised with each of the integration periods such that the scan function is repeated multiple times during each integration period. For example, the scan function may be repeated an integer number of times during each integration period.

However, the inventors have recognised that, although varying the amplitude and/or frequency of the RF voltage with time in the above-described manner helps ensure ions of a relatively wide range of mass to charge ratios are well transmitted during each integration period, this technique can result in some mass to charge ratios having excessively high ion arrival rates (i.e. instantaneous intensities) at the mass analyser during a portion of the integration period. This can cause problems, such as maintaining the ion arrival rate at the mass analyser (or detector thereof) below a threshold value, e.g. to prevent detector saturation or space-charge effects etc. The inventors have recognised that it is desirable to determine how the ion arrival rate for a given species (or mass to charge ratio) varies throughout the integration period, and to then use this data to control the spectrometer or to correct the mass spectral data obtained therefrom.

In order to illustrate the benefits of the preferred embodiments of the present invention, an example will now be described in which the ion transmission through an RF-only quadrupole ion guide is described.

Figure 2:
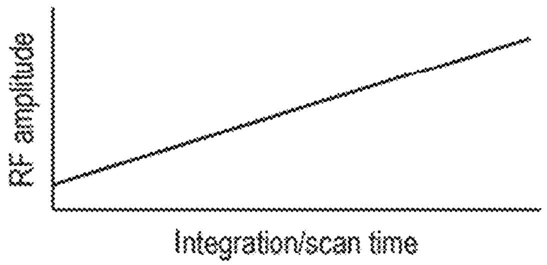
FIG. 2 shows an example of how the amplitude of the RF voltage applied to an ion guide in FIG. 1 may be scanned with time.

FIG. 2 shows a simplified example of how the amplitude of the RF voltage applied to the RF-only quadrupole ion guide may be scanned with time during the integration period of the TOF mass analyser. As can be seen, the amplitude of the RF voltage is initially relatively low at the start of the integration period and is progressively and continuously ramped up to a relatively high amplitude at the end of the integration period. As such, the x-axis represents not only the time during the scan of the RF amplitude, but also the time during the integration period of the TOF mass analyser.

As described above, the transmission efficiency of an ion of a given mass to charge ratio depends on the amplitude of the RF voltage and so scanning the amplitude, e.g. in the manner shown, will help to ensure that each mass to charge ratio ion will be transmitted to the TOF mass analyser with relatively high efficiency during at least some of the integration period. At the end of the integration period, another integration period may be performed during which the amplitude of the RF voltage applied to the ion guide is scanned again in the manner shown (or in a different manner). This may be repeated one or more further times for one or more respective integration periods.

Figure 3:
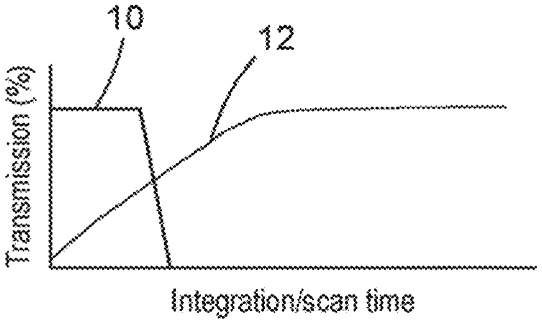
FIG. 3. shows the expected level of ion transmission through the ion guide of FIG. 2 for ions of two different mass to charge ratios.

FIG. 3. shows the expected level of ion transmission through the ion guide of FIG. 2 for ions of two different mass to charge ratios, as a function of the scan time for the RF amplitude applied to the ion guide of FIG. 1. The transmission level for each mass to charge ratio is shown as a relative transmission level, i.e. each point is normalised by its maximum transmission level. A first plot 10 shows the transmission level through the ion guide for ions having a relatively low mass to charge ratio. As can be seen, during the initial part of the RF scan (i.e. during the initial part of the integration period), the low mass to charge ratio ions are transmitted by the ion guide with a constant, high level of transmission. However, as the RF scan progresses, the transmission level of the low mass to charge ratio ions sharply drops until substantially none of these ions are transmitted by the ion guide. A second plot 12 shows the transmission level through the ion guide for ions having a relatively higher mass to charge ratio. As can be seen, at the start of the RF scan (i.e. at the start of the integration period), substantially none of these ions are transmitted by the ion guide. However, as the RF scan (i.e. time during the integration period) progresses, the transmission level of the high mass to charge ratio ions progressively increases until it reaches a maximum transmission level and remains at that level for the rest of the scan (i.e. for the rest of the integration period).

As described above, the TOF mass analyser is operated so as to pulse a packet of ions into its time of flight region towards an ion detector and obtain mass spectral data for that packet of ions. This process is repeated multiple times during the RF scan time, i.e. during the integration period, so as to obtain multiple respective sets of mass spectral data.

The mass spectral data obtained during the integration period are then summed, e.g. for use in forming a composite mass spectrum.

It will be appreciated that in the example shown in FIG. 3, each mass spectral data set obtained for a pulse into the TOF mass analyser that occurs early on in the scan time (i.e. early in the integration period) will include both the low and high mass to charge ratio ions. The low mass to charge ratio ions may have a relatively high intensity due to their relatively high level of transmission through the RF ion guide, whereas the high mass to charge ratio ions may have a relatively low intensity due to their relatively low level of transmission through the RF ion guide. In contrast, each mass spectral data set obtained for a pulse into the TOF mass analyser that occurs late on in the scan time (i.e. late in the integration period) will include only high mass to charge ratio ions, e.g. with a relatively high intensity due to their relatively high level of transmission through the RF ion guide.

Figure 4:
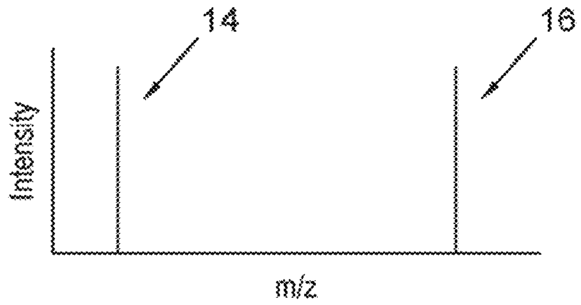
FIG. 4 shows a composite mass spectrum formed by summing mass spectral data obtained during the scan time shown in FIG. 3.

FIG. 4 shows the composite mass spectrum formed by summing the mass spectral data obtained from the multiple TOF pulses that occur during the scan time (i.e. integration period) shown in FIG. 3. This spectrum includes a peak 14 for the low mass to charge ratio ions and a peak 16 for the higher mass to charge ratio ions.

The ion arrival rate for any given mass to charge ratio ion, as a function of integration/scan time, may then be calculated based on the intensity of that ion detected in the composite mass spectrum (FIG. 4) and the expected variation in transmission level of that ion by the RF-only ion guide as a function of integration/scan time (FIG. 3).

Figure 5:
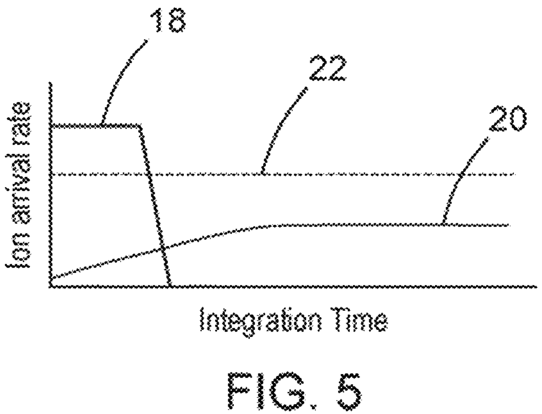
FIG. 5. shows the calculated ion arrival rate as a function of the scan time for the different mass to charge ratio ions shown in FIG. 3.

FIG. 5. shows the calculated ion arrival rate at the TOF mass analyser as a function of the integration time (i.e. RF scan time) for each of the low and high mass to charge ratio ions. The ion arrival rate as a function of integration/scan time for the low mass ions 18 is calculated based on the intensity of the low mass ions 14 detected in the composite mass spectrum of FIG. 4 and the expected variation in transmission level of these ions 10 by the RF-only ion guide as a function of integration/scan time as shown in FIG. 3. Similarly, the ion arrival rate as a function of integration/scan time for the high mass ions 20 is calculated based on the intensity of the high mass ions 16 detected in the composite mass spectrum of FIG. 4 and the expected variation in transmission level 12 of these ions by the RF-only ion guide as a function of integration/scan time as shown in FIG. 3.

FIG. 5 also illustrates an example of a target threshold level 22 of ion arrival rate that may be desired at the TOF mass analyser. It may be desired to maintain the ion arrival rate of one or more of the ions to be mass analysed below this threshold level 22, e.g. to prevent saturation of the detector in the TOF mass analyser. It can be seen that in this example the ion arrival rate of the low mass ions 18 exceeds the target threshold 22 during the initial part of the integration/scan time, whereas the ion arrival rate of the high mass ions 20 does not exceed the target threshold 22 during any of the integration/scan time. However, it has only become apparent that the threshold 22 has been exceeded (by the low mass ions) because this embodiment determines how the ion arrival rate of each mass to charge ratio varies as a function of time. In contrast, if the average ion arrival rate of each mass to charge ratio ion over the integration period had been determined (e.g. based only on the intensity in FIG. 4 and the duration of the integration period), then the average ion arrival rate may be determined to be below the threshold value 22, whereas in fact it is not for part of the integration period.

In order to better understand the concepts disclosed herein, an embodiment was experimentally determined in which the mass spectrometer comprises a quadrupole ion guide and a TOF mass analyser (i.e. a Q-ToF mass spectrometer). The spectrometer was operated in an MS mode (i.e. precursor ion mode) in order to acquire mass spectral data for precursor ions having a range of mass to charge ratios between 50 and 2000 amu. The quadrupole ion guide was operated in an RF-only mode, i.e. as an ion guide and not a mass filter. The quadrupole ion guide has an inscribed radius $r_0$ of 5.33 mm and the RF voltage applied to it had a frequency of 0.832 MHz. However, it will be appreciated that these values are examples only and that ion guides having other sizes and/or RF frequencies may be used.

The mass spectrometer may be configured such that when a range of mass to charge ratios is selected to be analysed, the spectrometer automatically selects a corresponding pre-set scan function for the RF amplitude applied to RF-only ion guide. For example, if a first range of mass to charge ratios is selected to be analysed then the mass spectrometer may automatically select a first pre-set scan function and then scan the RF amplitude applied to the RF-only ion guide during the integration period in a first manner set by the first scan function. In contrast, if a second, different range of mass to charge ratios is selected to be analysed then the mass spectrometer may automatically select a second, different pre-set scan function and then scan the RF amplitude applied to the RF-only ion guide during the integration period in a second manner set by the second scan function that is different to said first manner. The pre-set functions may be determined and loaded onto the spectrometer by the manufacturer of the mass spectrometer.

Figure 6:
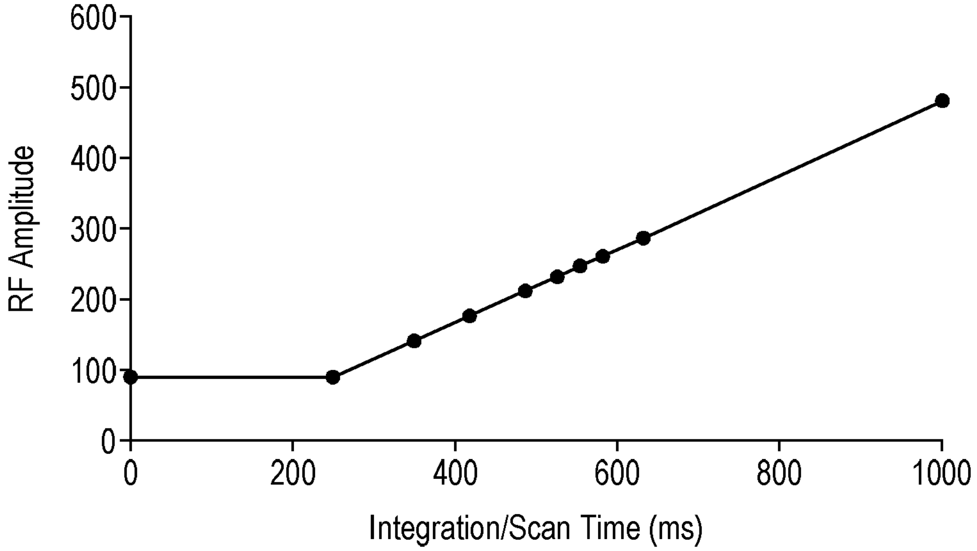
FIG. 6 shows an example of how the amplitude of the RF voltage applied to an ion guide may be scanned with time during an integration period of a mass analyser.

FIG. 6 shows an example of how the amplitude of the RF voltage applied to the RF-only quadrupole ion guide was scanned with time during a 1 second integration period of the TOF mass analyser in order to analyse ions having mass to charge ratios in the range of 50 to 2000 amu. As will be appreciated, any reference to the amplitude of the RF voltage herein refers to the 0 to peak amplitude. In the example shown, the amplitude of the RF voltage is initially relatively low and is maintained constant for an initial part of the scan/integration time. The amplitude is then progressively ramped up to a relatively high amplitude at the end of the scan/integration period. In order to determine the mass to charge ratio dependent transmission of the RF-only ion guide, the transmission of three different mass to charge ratios were examined, as will be described below.

Figure 7:
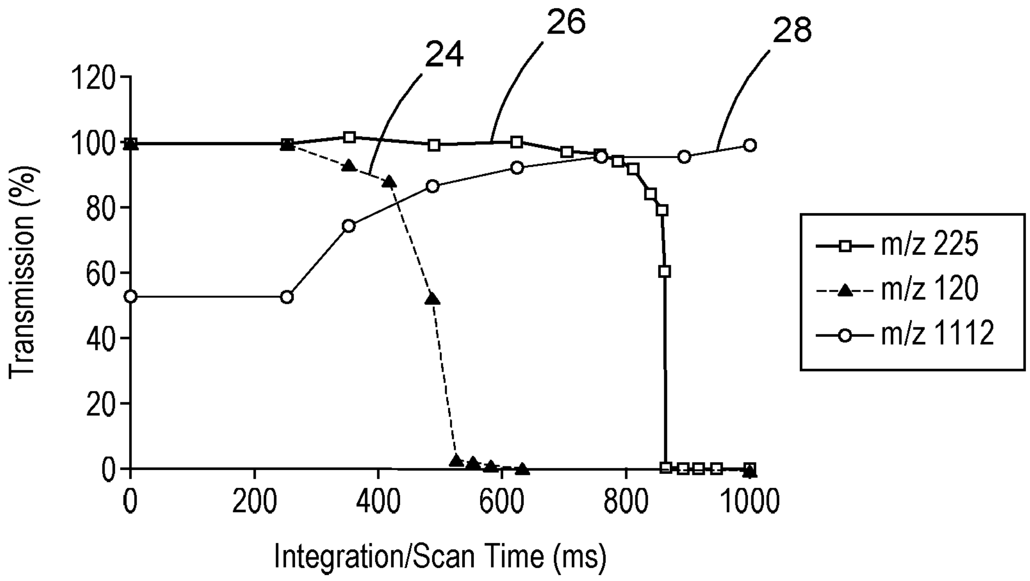
FIG. 7 shows the relative transmission level of ions having three different mass to charge ratios by an ion guide as a function of the scan time, when using the scan function shown in FIG. 6.

FIG. 7 shows the relative transmission level of ions having three different mass to charge ratios by the RF ion guide as a function of the scan time, when using the scan function shown in FIG. 6. More specifically, FIG. 7 shows a plot 24 for the relative transmission of ions having a mass to charge ratio of 120, a plot 26 for the relative transmission of ions having a mass to charge ratio of 225, and a plot 28 for the relative transmission of ions having a mass to charge ratio of 1112. Each of these plots was obtained by recording the transmission levels of the ion at different static RF amplitudes (which are illustrated by the data points along each plot) and then plotting these transmission levels (normalised by the maximum transmission level to be relative transmission levels) as a function of the scan/integration time.

Figure 8:
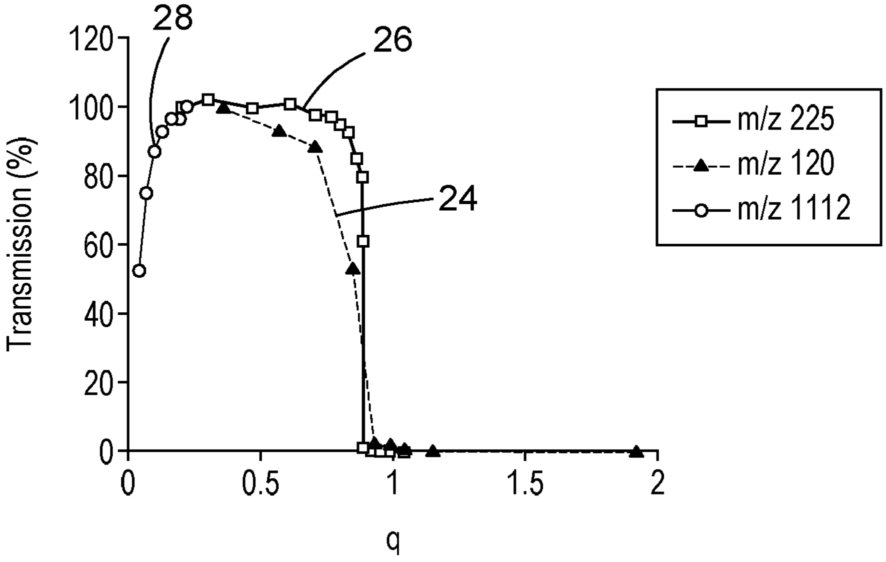
FIG. 8 shows the same data as in FIG. 7, except wherein the x-axis has been converted into the dimensionless parameter q.

FIG. 8 shows the same data as in FIG. 7, except wherein the scan/integration time along the x-axis of FIG. 7 has been converted into the dimensionless parameter q in FIG. 8. The parameter q is given by:

$$q = \frac{4eV}{m \cdot r_0 \cdot \Omega^2}$$

where e is the electron charge, V is the 0 to peak RF voltage applied to the ion guide, m is the mass to charge ratio of the ion, $r_0$ is the inscribed radius of the quadrupole rod electrodes, and Ω is the frequency of the RF voltage (in radians).

As can be seen from the plot 28 in FIG. 8, the highest mass to charge ratio ions (m/z=1112) had a relatively low transmission level through the ion guide at low values of the parameter q. This high mass (low values of the parameter q) transmission characteristic is due to the initial energy and entrance conditions of ions entering the RF ion guide. In contrast, the loss of transmission level at high values of the parameter q results from the known instability conditions for ions in oscillating in the quadrupolar potential of the ion guide. It can be seen that for all of the three types of ions, the relative transmission level varies as a function of the parameter q in a similar characteristic manner. Accordingly, this characteristic transmission curve can be used to predict the relative transmission of ions having other mass to charge ratios (in the mass to charge ratio range acquired by the TOF mass analyser) as the RF voltage amplitude is scanned and q varies for each mass to charge ratio. It will be appreciated from FIG. 8 that the relative transmission level as a function of the parameter q may be modelled as a square wave function.

Figure 9:
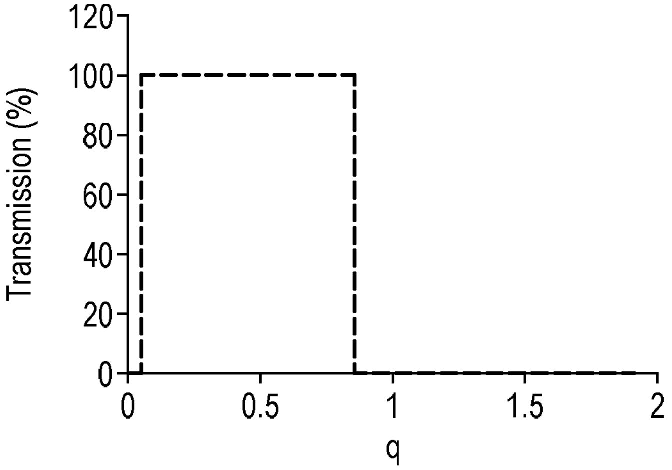
FIG. 9 shows how the relative transmission level as a function of the parameter q may be modelled as a square wave function.

FIG. 9 shows how the relative transmission level as a function of the parameter q may be modelled as a square wave function. This model may then be used to estimate the relative transmission level as a function of scan/integration time for an ion of any mass to charge ratio (of the mass to charge ratio range being acquired).

More specifically, as described above, the ion arrival rate of ions having a selected mass to charge ratio, as a function of integration/scan time, may be calculated based on the intensity detected for that mass to charge ratio in the composite mass spectrum (e.g. the number of ions) and the expected variation in transmission level of these ions (by the RF-only ion guide) as a function of integration/scan time. For example, for the ions having a mass to charge ratio of 120, the average ion arrival rate ($Is_{120}$) per push of the TOF mass analyser may be determined as the intensity of the peak recorded at m/z=120 in the composite TOF mass spectrum (i.e. the number of m/z=120 ions) divided by the product of the TOF pusher frequency and the duration of the integration period (i.e. 1 s in this example). Referring back to FIG. 7, it can be seen that the relative transmission 24 for the ions having a mass to charge ratio of 120 is at or about 100% for the first half of the scan/integration time and then close to or at 0% for the second half of the scan/integration time. Therefore, the actual ion arrival rate can be predicted to be approximately twice the average ion arrival rate $Is_{120}$ for the first half of the scan/integration time and approximately zero for the second half of the scan/integration time.

Similarly, for the ions having a mass to charge ratio of 225, the average ion arrival rate ($Is_{225}$) per push of the TOF mass analyser may be determined as the intensity of the peak recorded at m/z=225 in the composite TOF mass spectrum (i.e. the number of m/z=225 ions) divided by the product of the TOF pusher frequency and the duration of the integration period (i.e. 1 s in this example). Referring back to FIG. 7, it can be seen that the relative transmission 26 for the ions having a mass to charge ratio of 225 is at or about 100% for the 85% of the scan/integration time and then close to or at 0% for the last 15% of the scan/integration time. Therefore, the actual ion arrival rate can be predicted to be 1.18 times (i.e. 1/0.85) the average ion arrival rate $Is_{225}$ per push for the first 85% of the scan/integration time and approximately zero for the last 15% of the scan/integration time.

Predicting the actual ion arrival rate of a given mass to charge ratio as a function of time is important, for example, where it is desired to maintain the maximum ion arrival rate below a target threshold. As will be appreciated from the above example, the average ion arrival rate for a given mass to charge ratio over the entire integration/scan period may be lower than the actual ion arrival rate (instantaneous intensity) at certain times during that period. Therefore, if the average ion arrival rate is relied upon then problems may occur, such as saturation of the detector, since the actual ion arrival rate may be higher than the target threshold at certain times. As the embodiments described above more accurately predict or calculate the ion arrival rate of a given mass to charge ratio over the integration/scan time, the ion arrival rate can be better controlled throughout the integration/scan period so as to prevent it rising above the target threshold during any of the integration/scan period or during a predefined portion of the integration period.

For example, the level of ion attenuation may be dynamically adjusted during an integration period, based on the predicted ion arrival rate of a given mass to charge ratio as a function of time, so as to maintain the maximum ion arrival rate during that period below the target threshold. This target threshold may be set such that the dynamic range of the detection system is not exceeded.

Considering the above example for ions having m/z=120, if the average ion arrival rate over the integration/scan period $Is_{120}$ is determined and used to control the ion transmission so as to keep the ion arrival rate below a target threshold, the actual maximum ion arrival rate for these ions during the integration/scan period may be as high as twice the average ion arrival rate $Is_{120}$. Under these conditions both the mass accuracy and the quantitative accuracy for this mass to charge ratio will be distorted. In contrast, in the embodiment described above, the ion arrival rate for m/z=120 would be controlled in a manner such that the average ion arrival rate $Is_{120}$ is actually less than half the target threshold.

According to embodiments described herein, the instantaneous intensity (i.e. ion arrival rate) of a given mass to charge ratio as a function of integration time (for a composite mass spectrum) may be estimated/reconstructed based on the intensity of those ions in the composite mass spectrum and how the transmission level of those ions through an RF ion-optical component varies during the integration period. The variation of the transmission level may be known, or may be theoretically or experimentally determined. This information is may then be used to control the spectrometer in various ways or to modify the mass spectral data that has been recorded.

The techniques described herein are particularly useful, for example, for controlling feedback-based ion transmission control modes in either parent or fragment ion analysis modes, such as MS or MSe techniques. For example, in a feedback ion transmission control, the ion arrival rate of a given mass to charge ratio as a function of integration time may be determined and used to control the spectrometer such that the ion arrival rate of that mass to charge ratio does not increase beyond a threshold value during the integration period. For example, the beam of the ions passing to the mass analyser may be attenuated so that the signal for the ions remains below the threshold. The amount of attenuation may be varied with time during the integration period based on the determined ion arrival rate of a given mass to charge ratio as a function of integration time. For example, referring to the example shown in FIG. 5, the attenuation may be relatively high during the first part of the integration period so as to prevent the ion arrival rate at the mass analyser (or detector thereof) of ions having the low mass to charge ratio 18 from being higher than the threshold level 22. The attenuation may then be changed to be relatively lower during a subsequent part of the integration period, whilst still maintaining the ion arrival rate at the mass analyser (or detector thereof) lower than the threshold level 22. The threshold level may be set so that the ion signal at the detector of the mass analyser remains within a predetermined range of intensities or such that the ions do not exceed the space-charge capacity of the mass analyser (or other ion-optical component in the spectrometer, such as an ion trap). Alternatively, or additionally, the signal may be used to control the gain of the ion detector so as to ensure that the amplified ion signal remains within a range of intensities desired for the detection system.

The target threshold for feedback ion transmission control can be calculated to avoid any saturation during the integration period or to allow some known amount of saturation during integration time.

Embodiments have been described in which the amount of attenuation may be varied during the integration period, based on the determined ion arrival rate of a given mass to charge ratio as a function of integration time. It is also contemplated that the attenuation may comprise repeatedly switching between higher and lower attenuation modes and during the integration period and that the level of attenuation may be varied during this period by varying that the rate that the two modes are switched between.

It is also contemplated that the ion arrival rate of a given mass to charge ratio, as a function of integration time, may be determined and used to select an attenuation level (or switching rate) that is substantially constant throughout the integration time. For example, the ion arrival rate of the most intense mass to charge ratio (in the composite mass spectrum) as a function of integration/scan time may be calculated in the manner described above. The attenuation may then be set such that the ion arrival rate of ions having this mass to charge ratio remains below a threshold during a subsequent integration/scan time. By way of example, if ions 14 in FIG. 4 were determined to be the most intense in the composite spectrum then in this embodiment the attenuation would be controlled such that the ion arrival rate 18 in FIG. 5 remained below threshold 22. Alternatively, it may be known in advance of the experiment which target mass to charge ratio is desired to be controlled so as to maintain its ion signal below the threshold. The ion arrival rate for that target mass to charge ratio, as a function of integration/scan time, may then be calculated in the manner described above and the attenuation may then be set such that the ion arrival rate of ions having this mass to charge ratio remains below a threshold during a subsequent integration/scan time.

The techniques described herein may be used, for example, when screening an analytical sample for a target species, e.g. in an MSe screening experiment. The technique may be used in order to keep the detected ion signal for the target species within a predetermined range of intensities. During such an experiment the mass to charge ratio of the target species is known. The ion arrival rate for the target species as a function of integration time may be determined and the ion transmission control system may be controlled, e.g. as described above, to maintain the signal for the target species in the desired range. The elution period of the target species from an upstream device may also be known, in which case the ion transmission control system may be controlled to keep the ion signal for the target species within the desired range (only) during the elution period. In this case, the threshold value for feedback will depend on the mass to charge ratio transmission characteristics for each peak during the integration period. The threshold value may be different for different mass to charge ratio values.

Additionally, or alternatively to the attenuation techniques described above, the ion arrival rate of a given mass to charge ratio as a function of integration time may be determined and used to calculate a correction factor that is applied to the recorded mass spectral data (e.g. in a post-processing step). The calculated correction factor may be applied to the mass spectral data so as to correct the mass to charge ratio and/or intensity of a detected mass peak. For example, it may be determined from the ion arrival rate as a function of integration time that the ion detection system would have been saturated for part of the integration period. The recorded mass spectral data may then be corrected based on this determination so as to compensate for the saturation, e.g. by increasing the intensity of the mass peak.

Additionally, or alternatively to the techniques described above, the ion arrival rate of a given mass to charge ratio as a function of integration time may be determined and used to estimate the number of ions of each mass to charge ratio that are trapped in an ion trapping device upstream of the TOF mass analyser, at any given time.

Although the present invention has been described with reference to preferred embodiments, it will be understood by those skilled in the art that various changes in form and detail may be made without departing from the scope of the invention as set forth in the accompanying claims.

For example, although the mass analyser has been described as being a TOF mass analyser, it may alternatively be another type of mass analyser that produces spectral data that is accumulated/summed over an integration period.

Although a square wave model for the transmission profile (as a function of the parameter q) has been described above, it will be appreciated that the present invention is not limited to modelling using square wave functions and that other functions may be used, such as more accurate ways of modelling the transmission characteristics. For example, the transmission profile could be modelled as trapezoidal, Gaussian or other shaped function.

Embodiments have been described in which the ions are fragmented prior to the mass analyser. In such embodiments, the intensities of the product ions that are detected will be related to transmission levels of their parent ions. Accordingly, the relevant transmission levels are transmission levels related to the transmission levels of the parent ions.

The techniques disclosed herein are not limited to embodiments in which the intensity of a species varies during the integration period due to the RF voltage applied to an ion-optical device being varied. Rather, the present invention is applicable to other modes of operation where the intensity of one or more species varies during the integration period. For example, the techniques described herein may be applied to multi-push TOF Enhanced Duty Cycle techniques, such as disclosed in U.S. Pat. No. 8,183,524.

The techniques described herein are also applicable to modes in which the intensity of a given species may vary during the integration period due to an ion filter, such as a mass filter, being arranged upstream of the mass analyser and being scanned to transmit different mass to charge ratios at different times during the integration period. For example, a (wideband) mass filter may be provided that transmits a range of different mass to charge ratios at any given time, but that is scanned with time so that the lower and/or upper ends of the transmitted mass range change during the integration period.

Additionally, or alternatively, an ion separator or filter such as an ion mobility separator or mass filter may be arranged upstream of the mass analyser for transmitting ions having different physicochemical properties to the mass analyser at different times during the integration period. In these types of modes, the composite mass spectral data that is recorded may be collapsed in one dimension such that a 2D spectrum of mass to charge ratio versus intensity is created. The maximum ion arrival rate or ion arrival rate function for each species of ion may be estimated for each species in the collapsed spectrum from the known ion arrival profile in the 3D spectrum (i.e. mass analyser m/z vs Intensity vs mass filter or separator scan time). Collapsing the data into two dimensions speeds up processing for data-dependent modes of operation like feedback transmission or detector gain control.

For example, a quadrupole mass filter may be scanned with a wideband transmission window, e.g. from m/z=400-900 with a 50 amu transmission window. The mass filter may be scanned over this mass range in, for example, 0.1 second such that each peak is 10 ms wide. Ideally, each peak would be attenuated to keep the intensity of all of the ion species below a threshold, although this would require a fast attenuation device. Alternatively, the mass spectral data may be collapsed in the quadrupole scanning dimension such that a 2D spectrum of intensity verses mass to charge ratio is created from the mass spectral data obtained during the quadrupole scan. The maximum proportion of the total integration time during which any given mass to charge ratio is transmitted and detected can be determined from the size of the mass transmission window and the scan function of the mass filter, because a given mass to charge ratio is only transmitted whilst the mass window encompasses that mass to charge ratio. In the example above, a given mass to charge ratio will only be able to be transmitted whilst the 50 amu mass window encompasses it. If the window is scanned across the m/z=400-900 mass range (i.e. a range of 500 amu) at a constant rate this means that the mass to charge ratio is transmitted for a 50/500 th of the scan time (i.e. $\frac{1}{10}$th of the total integration time). Accordingly, the intensity in the composite spectrum of any given mass to charge ratio is determined to be due to ions arriving over only this proportion of the total integration time. The ion arrival rate for these ions can then be determined based on their intensity in the composite spectrum and the proportion of the total integration time that these ions arrived over. This ion arrival rate may then be compared to a threshold and the ion attenuation during a subsequent scan may then be controlled based on the comparison such that the ion arrival rate of these ions is lower than the threshold in the subsequent scan. It will be appreciated that the data obtained after the attenuation may be rescaled by the attenuation factor.

Embodiments are also contemplated in which the width and/or scan speed of the mass transmission window are varied during the scan, i.e. during the integration period.

The invention claimed is:

1. A method of mass spectrometry comprising:

mass analysing ions with a mass analyser so as to obtain first mass spectral data;

summing the first mass spectral data obtained during a first integration period;

obtaining a transmission profile indicative of how the transmission level of first ions to said mass analyser would vary with time during the first integration period;

determining an ion arrival rate of said first ions at the mass analyser during the first integration period based on said transmission profile; and controlling the operation of a mass spectrometer that comprises said mass analyser based on the determined ion arrival rate of said first ions.

2. The method of claim 1, wherein the method further comprises mass analysing ions with the mass analyser so as to obtain second mass spectral data and summing that second mass spectral data obtained during a second integration period; wherein said controlling the operation of the mass spectrometer is performed during the second integration period.

3. The method of claim 1, comprising adjusting mass spectral data obtained by the mass analyser based on the determined ion arrival rate of said first ions.

4. The method of claim 1, wherein said step of mass analysing ions comprises performing a plurality of mass analysis cycles during the first integration period so as to obtain a plurality of respective sets of mass spectral data.

5. The method of claim 1, comprising varying the operation of one or more ion-optical devices arranged upstream of the mass analyser with time according to a scan function during each of the first and/or second integration period such that said first ions, or parent ions of said first ions, are transmitted by the one or more ion-optical devices with an intensity that varies as a function of time within each of the first and/or second integration period.

6. The method of claim 5, wherein an RF voltage is applied to at least one of the one or more ion-optical devices and the RF voltage is varied with time according to a scan function during each of said first and/or second integration period.

7. The method of claim 5, wherein at least one of the one or more ion-optical device is an RF-only ion guide and an RF voltage applied thereto is varied with time according to a scan function during each of said first and/or second integration period.

8. The method of claim 5, wherein at least one of the one or more ion-optical devices is a mass filter having a mass transmission window that is varied with time according to a scan function during each of said first and/or second integration period.

9. The method of claim 5, wherein the scan function is synchronised with the first and/or second integration period of the mass analyser such that the scan function is performed one or more complete times during each of the first and/or second integration period.

10. The method of claim 5, comprising receiving an electronic input indicating a range of mass to charge ratios that is to be analysed by the mass analyser, and automatically selecting the scan function for each of the one or more ion-optical devices from a plurality of scan functions based on said range of mass to charge ratios.

11. The method of claim 2, wherein said step of controlling the operation of the mass spectrometer comprises controlling the transmission level of ions to the mass analyser during the second integration period based on said determined ion arrival rate of said first ions.

12. The method of claim 11, wherein said step of controlling the transmission level of ions comprises attenuating ions at a level that is based on said determined ion arrival rate of said first ions.

13. The method of claim 12, wherein the ions are attenuated at a constant level, that is based on said determined ion arrival rate of said first ions, for at least part of the second integration period.

14. The method of claim 12, wherein said determined ion arrival rate includes a relatively high ion arrival rate at a first time after the start of the first integration period and a relatively lower ion arrival rate at a second, different time after the start of the first integration period; and wherein the transmission level of ions to the mass analyser during said second integration period is controlled based on said determined ion arrival rate so as to perform a relatively high level of attenuation at a time after the start of said second integration period that corresponds to said first time, and to perform a relatively lower level of attenuation at a time after the start of said second integration period that corresponds to said second time.

15. The method of claim 11, wherein said step of controlling the transmission level of ions comprising attenuating ions based on the determined ion arrival rate of said first ions so as to maintain the maximum ion arrival rate during at least part of the second integration period below a target threshold.

16. The method of claim 2, wherein the mass analyser comprises an ion detector having an amplifier for amplifying the ion signal generated in the ion detector, and said step of controlling the operation of the mass spectrometer comprises controllably varying the gain of the amplifier during the second integration period as a function of time based on said determined ion arrival rate of said first ions.

17. The method of claim 1, comprising using said determined ion arrival rate to calculate a correction factor for mass spectral data of the first ions.

18. A mass spectrometer comprising:

a mass analyser for mass analysing ions and control circuitry configured to control the mass spectrometer to:

mass analyse ions with the mass analyser so as to obtain mass spectral data;

sum the mass spectral data obtained during an integration period;

store or obtain a transmission profile indicative of how the transmission level of first ions to said mass analyser would vary with time during the integration period;

determine an ion arrival rate of said first ions at the mass analyser during the integration period based on said transmission profile; and control the operation of the mass spectrometer based on the determined ion arrival rate of said first ions.

19. A method of mass spectrometry comprising:

mass analysing ions with a mass analyser so as to obtain first mass spectral data;

summing the first mass spectral data obtained during a first integration period;

determining an intensity in the summed mass spectral data of first ions having a selected mass to charge ratio;

obtaining a transmission profile indicative of how the transmission level of the first ions to said mass analyser would vary with time during the first integration period; and determining an ion arrival rate of said first ions at the mass analyser as a function of time during the first integration period based on said intensity and said transmission profile.

20. A mass spectrometer configured to perform the method of claim 19, the mass spectrometer comprising:

a mass analyser for mass analysing ions; and control circuitry configured to control the mass spectrometer to:

mass analyse ions with the mass analyser so as to obtain first mass spectral data;

sum the first mass spectral data obtained during a first integration period;

determine an intensity in the summed mass spectral data of first ions having a selected mass to charge ratio;

store or obtain a transmission profile indicative of how the transmission level of the first ions to said mass analyser would vary with time during the first integration period; and determine an ion arrival rate of said first ions at the mass analyser as a function of time during the first integration period based on said intensity and said transmission profile.

* * * * *